United States Patent
Laitila et al.

(10) Patent No.: US 12,418,830 B2
(45) Date of Patent: Sep. 16, 2025

(54) APPARATUS, METHOD AND COMPUTER PROGRAM

(71) Applicant: NOKIA TECHNOLOGIES OY, Espoo (FI)

(72) Inventors: Matti Einari Laitila, Oulu (FI); Gayathri Tadas, Bengaluru (IN); Rakash Sivasiva Ganesan, Aschaffenburg (DE); Markus Sakari Isomäki, Espoo (FI); Devaki Chandramouli, Plano, TX (US); Zexian Li, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 360 days.

(21) Appl. No.: 18/127,377

(22) Filed: Mar. 28, 2023

(65) Prior Publication Data

US 2023/0319631 A1    Oct. 5, 2023

(30) Foreign Application Priority Data

Mar. 29, 2022  (IN) ............................. 202241018467

(51) Int. Cl.
   *H04W 28/06*   (2009.01)
(52) U.S. Cl.
   CPC .................. *H04W 28/06* (2013.01)
(58) Field of Classification Search
   CPC ......... H04W 28/0236; H04W 28/0268; H04W 28/06
   See application file for complete search history.

(56) References Cited

U.S. PATENT DOCUMENTS

| | | | | |
|---|---|---|---|---|
| 2020/0383004 A1* | 12/2020 | Hande | .................. | H04W 24/08 |
| 2020/0404604 A1* | 12/2020 | Hande | ............... | H04W 52/0216 |
| 2022/0417972 A1* | 12/2022 | Rossbach | .............. | H04W 72/20 |
| 2023/0135681 A1* | 5/2023 | Agarwal | ............... | H04L 5/0082 |
| | | | | 370/329 |
| 2023/0199600 A1* | 6/2023 | Xu | ........................ | H04W 72/54 |
| | | | | 370/331 |
| 2023/0308496 A1* | 9/2023 | Lee | ........................ | H04L 43/087 |
| 2023/0422098 A1* | 12/2023 | Diachina | ............... | H04W 72/52 |

FOREIGN PATENT DOCUMENTS

WO    WO-2023161349 A1 *  8/2023  ............. H04L 47/80

* cited by examiner

*Primary Examiner* — Thomas R Cairns
(74) *Attorney, Agent, or Firm* — SQUIRE PATTON BOGGS (US) LLP

(57) ABSTRACT

There is provided an apparatus, said apparatus comprising means for receiving, from a session management node, burst timing information for a 5G ingress node, receiving burst timing adjustment capability information for an application from a function associated with the application, determining at least one of preferred burst arrival times and periodicity at the 5G ingress node for at least one periodic traffic stream from the application based on the burst timing information and burst timing adjustment capability information and providing an indication of the at least one of determined preferred burst arrival times and periodicity to the function.

19 Claims, 11 Drawing Sheets

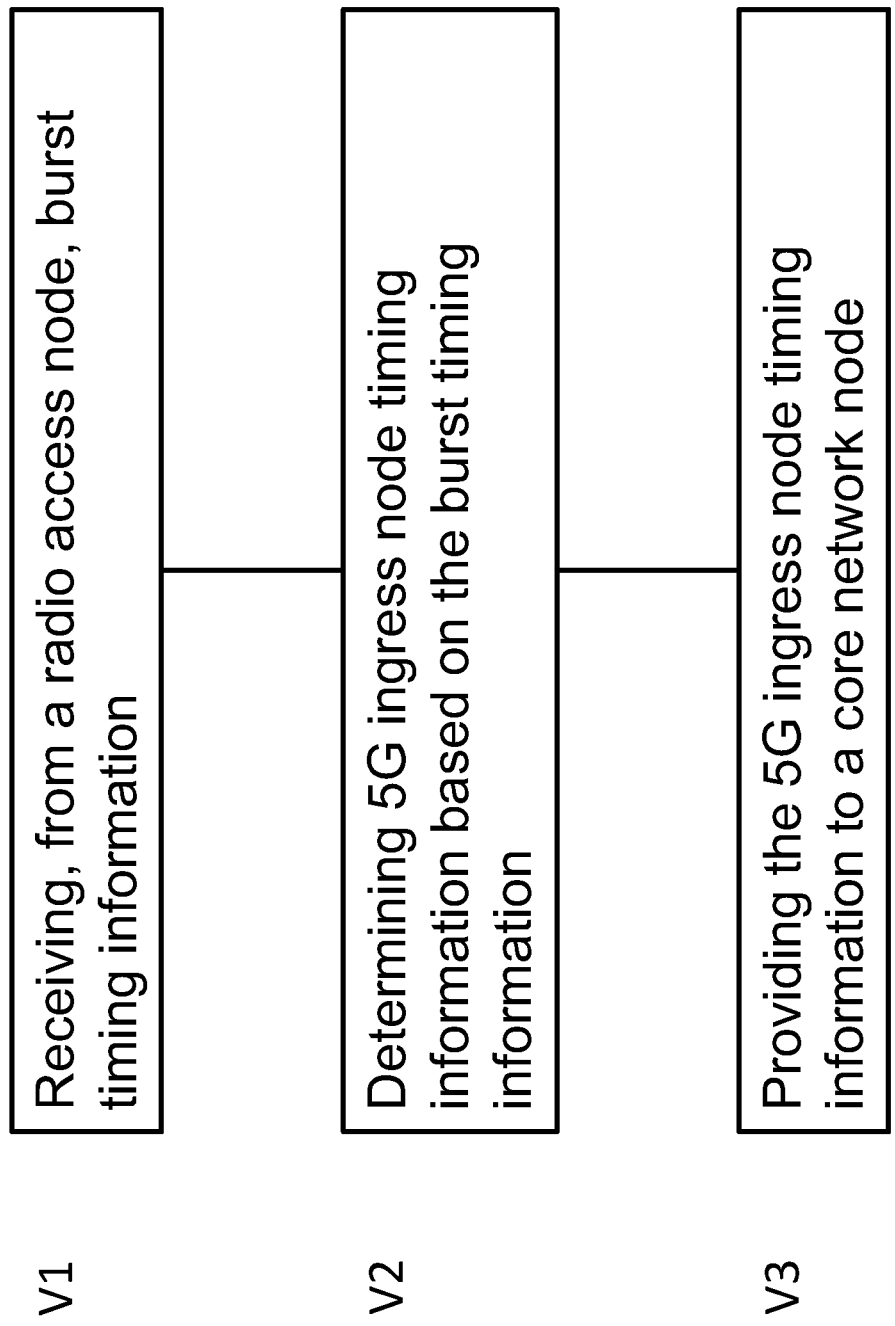

APPARATUS, METHOD AND COMPUTER PROGRAM

CROSS REFERENCE TO RELATED APPLICATION

This application claims the benefit of Indian Patent Application No. 202241018467, filed Mar. 29, 2022. The entire content of the above-referenced application is hereby incorporated by reference.

FIELD

The present application relates to a method, apparatus, system and computer program and in particular but not exclusively to proactive radio access network (RAN) preference for UL/DL to ensure extreme low latency.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

In a first aspect there is provided an apparatus comprising means for receiving, from a session management node, burst timing information for a 5G ingress node, receiving burst timing adjustment capability information for an application from a function associated with the application, determining at least one of preferred burst arrival times and periodicity at the 5G ingress node for at least one periodic traffic stream from the application based on the burst timing information and burst timing adjustment capability information and providing an indication of the at least one of determined preferred burst arrival times and periodicity to the function.

The apparatus may comprise means for providing the burst timing information to the function associated with the application.

The burst timing information may comprise at least one of an indication of a burst arrival window, BAW, and periodicity information.

The apparatus may comprise means for receiving the burst timing information prior to a radio access node receiving at least one traffic stream from the application and wherein the burst timing information comprises at least one of an indication of a BAW in absolute time or relative time and periodicity information.

The apparatus may comprise means for receiving the BAW feedback information after a radio access node receiving at least one traffic stream from the application and wherein the burst timing information comprises at least one of an indication of a burst arrival time, BAT, offset value, an indication of BAW in absolute time or relative time and periodicity information.

The burst timing adjustment capability information may comprise at least one of pro-active BAT adjustment pro-active periodicity adjustment and reactive mid-stream time offset shift.

The burst timing information may be associated with a user equipment, a PDU session, a QoS flow or a traffic flow for at least one of uplink and downlink.

In a second aspect there is provided an apparatus comprising means for, at a radio access node, determining, based on radio configuration and radio resource status, burst timing information, providing the burst timing information to a core network node and receiving traffic from an application based on at least one of preferred burst arrival time and periodicity determined at the core network node based on the burst timing information.

The apparatus may comprise means for receiving an indication in protocol data unit session modification signalling and providing the burst timing information in response to the indication.

The indication may comprise an indication of burst timing adjustment capability information for a function associated with the application.

In a third aspect there is proved an apparatus comprising means for, at a session management function, receiving, from a radio access node, burst timing information, determining 5G ingress node timing information based on the burst timing information and providing the 5G ingress node timing information to a core network node.

In a fourth aspect there is provided an apparatus comprising means for, providing burst timing adjustment capability information from a function associated with an application to a core network node and receiving from the core network node at the function an indication of at least one of determined preferred burst arrival times and periodicity at a 5G ingress node for at least one periodic traffic stream from the application.

In a fifth aspect there is provided a method comprising receiving, from a session management node, burst timing information for a 5G ingress node, receiving burst timing adjustment capability information for an application from a function associated with the application, determining at least one of preferred burst arrival times and periodicity at the 5G ingress node for at least one periodic traffic stream from the application based on the burst timing information and burst timing adjustment capability information and providing an indication of the at least one of determined preferred burst arrival times and periodicity to the function.

The method may comprise providing the burst timing information to the function associated with the application.

The burst timing information may comprise at least one of an indication of a burst arrival window, BAW, and periodicity information.

The method may comprise receiving the burst timing information prior to a radio access node receiving at least one traffic stream from the application and wherein the burst timing information comprises at least one of an indication of a BAW in absolute time or relative time and periodicity information.

The method may comprise receiving the BAW feedback information after a radio access node receiving at least one traffic stream from the application and wherein the burst timing information comprises at least one of an indication of a burst arrival time, BAT, offset value, an indication of BAW in absolute time or relative time and periodicity information.

The burst timing adjustment capability information may comprise at least one of pro-active BAT adjustment pro-active periodicity adjustment and reactive mid-stream time offset shift.

The burst timing information may be associated with a user equipment, a PDU session, a QoS flow or a traffic flow for at least one of uplink and downlink.

In a sixth aspect there is provided a method comprising, at a radio access node, determining, based on radio configuration and radio resource status, burst timing information, providing the burst timing information to a core network node and receiving traffic from an application based on at least one of preferred burst arrival time and periodicity determined at the core network node based on the burst timing information.

The method may comprise receiving an indication in protocol data unit session modification signalling and providing the burst timing information in response to the indication.

The indication may comprise an indication of burst timing adjustment capability information for a function associated with the application.

In a seventh aspect there is proved a method comprising, at a session management function, receiving, from a radio access node, burst timing information, determining 5G ingress node timing information based on the burst timing information and providing the 5G ingress node timing information to a core network node.

In an eighth aspect there is provided a method comprising, providing burst timing adjustment capability information from a function associated with an application to a core network node and receiving from the core network node at the function an indication of at least one of determined preferred burst arrival times and periodicity at a 5G ingress node for at least one periodic traffic stream from the application.

In a ninth aspect there is provided an apparatus comprising: at least one processor and at least one memory including a computer program code, the at least one memory and computer program code configured to, with the at least one processor, cause the apparatus at least to: receive, from a session management node, burst timing information for a 5G ingress node, receiving burst timing adjustment capability information for an application from a function associated with the application, determine at least one of preferred burst arrival times and periodicity at the 5G ingress node for at least one periodic traffic stream from the application based on the burst timing information and burst timing adjustment capability information and provide an indication of the at least one of determined preferred burst arrival times and periodicity to the function.

The apparatus may be configured to provide the burst timing information to the function associated with the application.

The burst timing information may comprise at least one of an indication of a burst arrival window, BAW, and periodicity information.

The apparatus may be configured to receive the burst timing information prior to a radio access node receiving at least one traffic stream from the application and wherein the burst timing information comprises at least one of an indication of a BAW in absolute time or relative time and periodicity information.

The apparatus may be configured to receive the BAW feedback information after a radio access node receiving at least one traffic stream from the application and wherein the burst timing information comprises at least one of an indication of a burst arrival time, BAT, offset value, an indication of BAW in absolute time or relative time and periodicity information.

The burst timing adjustment capability information may comprise at least one of pro-active BAT adjustment pro-active periodicity adjustment and reactive mid-stream time offset shift.

The burst timing information may be associated with a user equipment, a PDU session, a QoS flow or a traffic flow for at least one of uplink and downlink.

In a tenth aspect there is provided an apparatus comprising: at least one processor and at least one memory including a computer program code, the at least one memory and computer program code configured to, with the at least one processor, cause the apparatus at least to: at a radio access node, determine, based on radio configuration and radio resource status, burst timing information, provide the burst timing information to a core network node and receive traffic from an application based on at least one of preferred burst arrival time and periodicity determined at the core network node based on the burst timing information.

The apparatus may be configured to receive an indication in protocol data unit session modification signalling and providing the burst timing information in response to the indication.

The indication may comprise an indication of burst timing adjustment capability information for a function associated with the application.

In an eleventh aspect there is proved an apparatus comprising: at least one processor and at least one memory including a computer program code, the at least one memory and computer program code configured to, with the at least one processor, cause the apparatus at least to: at a session management function, receive, from a radio access node, burst timing information, determine 5G ingress node timing information based on the burst timing information and provide the 5G ingress node timing information to a core network node.

In a twelfth aspect there is provided an apparatus comprising: at least one processor and at least one memory including a computer program code, the at least one memory and computer program code configured to, with the at least one processor, cause the apparatus at least to: provide burst timing adjustment capability information from a function associated with an application to a core network node and receive from the core network node at the function an indication of at least one of determined preferred burst arrival times and periodicity at a 5G ingress node for at least one periodic traffic stream from the application.

In a thirteenth aspect there is provided a computer readable medium comprising program instructions for causing an apparatus to perform at least the following: receiving, from a session management node, burst timing information for a 5G ingress node, receiving burst timing adjustment capability information for an application from a function associated with the application, determining at least one of preferred burst arrival times and periodicity at the 5G ingress node for at least one periodic traffic stream from the application based on the burst timing information and burst timing adjustment capability information and providing an indication of the at least one of determined preferred burst arrival times and periodicity to the function.

The apparatus may be caused to perform providing the burst timing information to the function associated with the application.

The burst timing information may comprise at least one of an indication of a burst arrival window, BAW, and periodicity information.

The apparatus may be caused to perform receiving the burst timing information prior to a radio access node receiving at least one traffic stream from the application and wherein the burst timing information comprises at least one of an indication of a BAW in absolute time or relative time and periodicity information.

The apparatus may be caused to perform receiving the BAW feedback information after a radio access node receiving at least one traffic stream from the application and wherein the burst timing information comprises at least one of an indication of a burst arrival time, BAT, offset value, an indication of BAW in absolute time or relative time and periodicity information.

The burst timing adjustment capability information may comprise at least one of pro-active BAT adjustment pro-active periodicity adjustment and reactive mid-stream time offset shift.

The burst timing information may be associated with a user equipment, a PDU session, a QoS flow or a traffic flow for at least one of uplink and downlink.

In a fourteenth aspect there is provided a computer readable medium comprising program instructions for causing an apparatus to perform at least the following, at a radio access node, determining, based on radio configuration and radio resource status, burst timing information, providing the burst timing information to a core network node and receiving traffic from an application based on at least one of preferred burst arrival time and periodicity determined at the core network node based on the burst timing information.

The apparatus may be caused to perform receiving an indication in protocol data unit session modification signalling and providing the burst timing information in response to the indication.

The indication may comprise an indication of burst timing adjustment capability information for a function associated with the application.

In a fifteenth aspect there is proved a computer readable medium comprising program instructions for causing an apparatus to perform at least the following, at a session management function, receiving, from a radio access node, burst timing information, determining 5G ingress node timing information based on the burst timing information and providing the 5G ingress node timing information to a core network node.

In a sixteenth aspect there is provided a computer readable medium comprising program instructions for causing an apparatus to perform at least the following, providing burst timing adjustment capability information from a function associated with an application to a core network node and receiving from the core network node at the function an indication of at least one of determined preferred burst arrival times and periodicity at a 5G ingress node for at least one periodic traffic stream from the application.

In a seventeenth aspect there is provided a non-transitory computer readable medium comprising program instructions for causing an apparatus to perform at least the method according to the fifth, sixth, seventh or eighth aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 7 shows a flowchart of a method according to an example embodiment;

FIG. 8b shows a continuation of the signalling flow of FIG. 8a;

DETAILED DESCRIPTION

Before explaining in detail the examples, certain general principles of a wireless communication system and mobile communication devices are briefly explained with reference to FIGS. 1 to 3 to assist in understanding the technology underlying the described examples.

An example of a suitable communications system is the 5G System (5GS). Network architecture in 5GS may be similar to that of LTE-advanced. Base stations of NR systems may be known as next generation Node Bs (gNBs).

Changes to the network architecture may depend on the need to support various radio technologies and finer QoS support, and some on-demand requirements for example QoS levels to support QoE of user point of view. Also network aware services and applications, and service and application aware networks may bring changes to the architecture. Those are related to Information Centric Network (ICN) and User-Centric Content Delivery Network (UC-CDN) approaches. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

5G networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Figure 1:
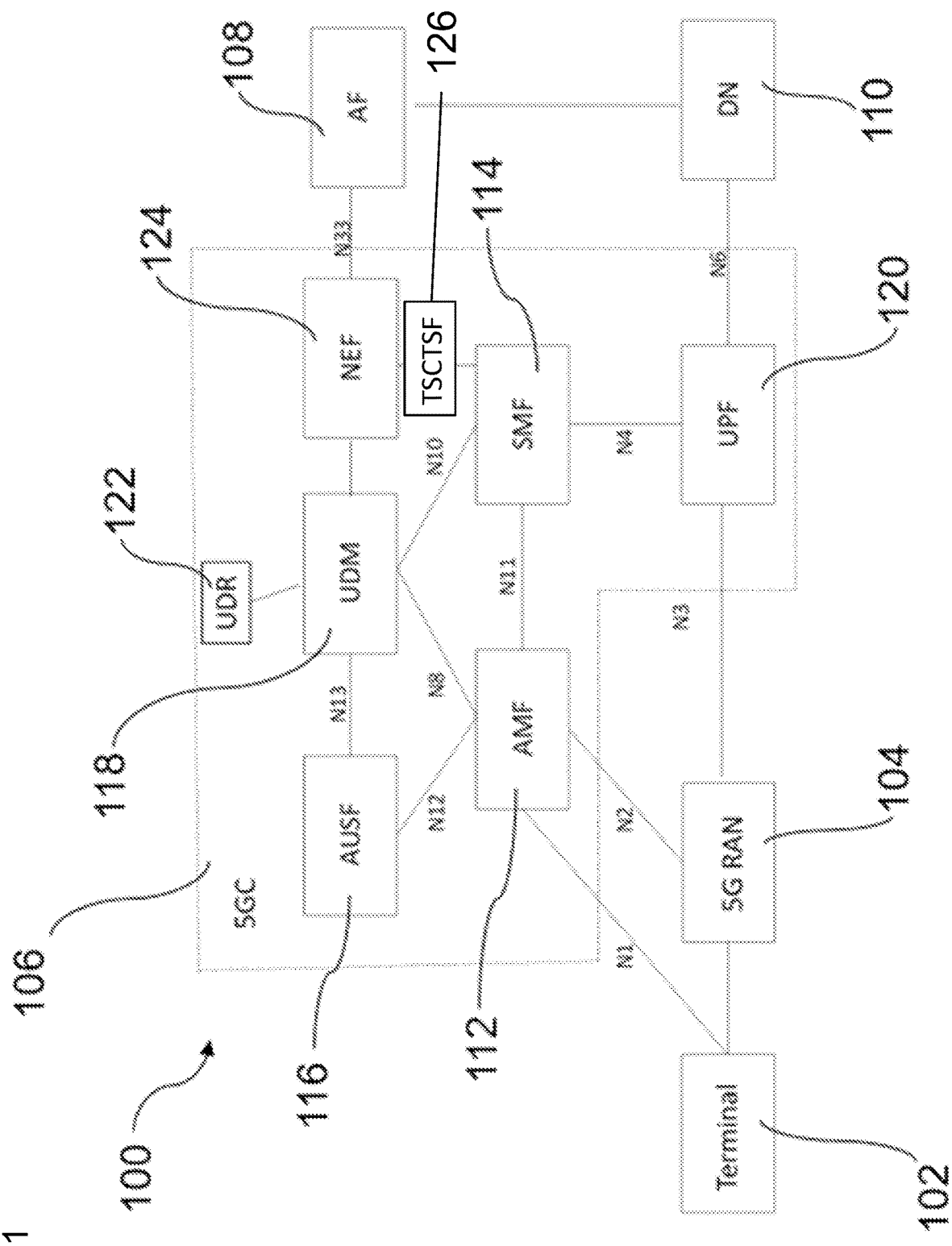
FIG. 1 shows a schematic diagram of an example 5GS communication system.

FIG. 1 shows a schematic representation of a 5G system (5GS) 100. The 5GS may comprise a user equipment (UE) 102 (which may also be referred to as a communication device or a terminal), a 5G radio access network (RAN) 104, a 5G core network (CN) 106, one or more application functions (AF) 108 and one or more data networks (DN) 110.

An example 5G core network (CN) comprises functional entities. The 5GCN 106 may comprise one or more access and mobility management functions (AMF) 112, one or more session management functions (SMF) 114, an authentication server function (AUSF) 116, a unified data management (UDM) 118, one or more user plane functions (UPF) 120, a unified data repository (UDR) 122 and/or a network exposure function (NEF) 124. The UPF is controlled by the SMF (Session Management Function) that receives policies from a PCF (Policy Control Function). A Time Sensitive Communication Time Synchronisation Function (TSCTSF) 126 forwards a Time Sensitive Communication Assistance Container (TSCAC) to the SMF via (PCF)

The CN is connected to a terminal device via the radio access network (RAN). The 5GRAN may comprise one or more gNodeB distributed unit (gNB-DU) functions connected to one or more gNodeB centralized unit (gNB-CU) functions. The RAN may comprise one or more access nodes.

A UPF (User Plane Function) whose role is called PSA (Protocol Data Unit (PDU) Session Anchor) may be responsible for forwarding frames back and forth between the DN (data network) and the tunnels established over the 5G towards the UE(s) exchanging traffic with the DN.

Figure 2:
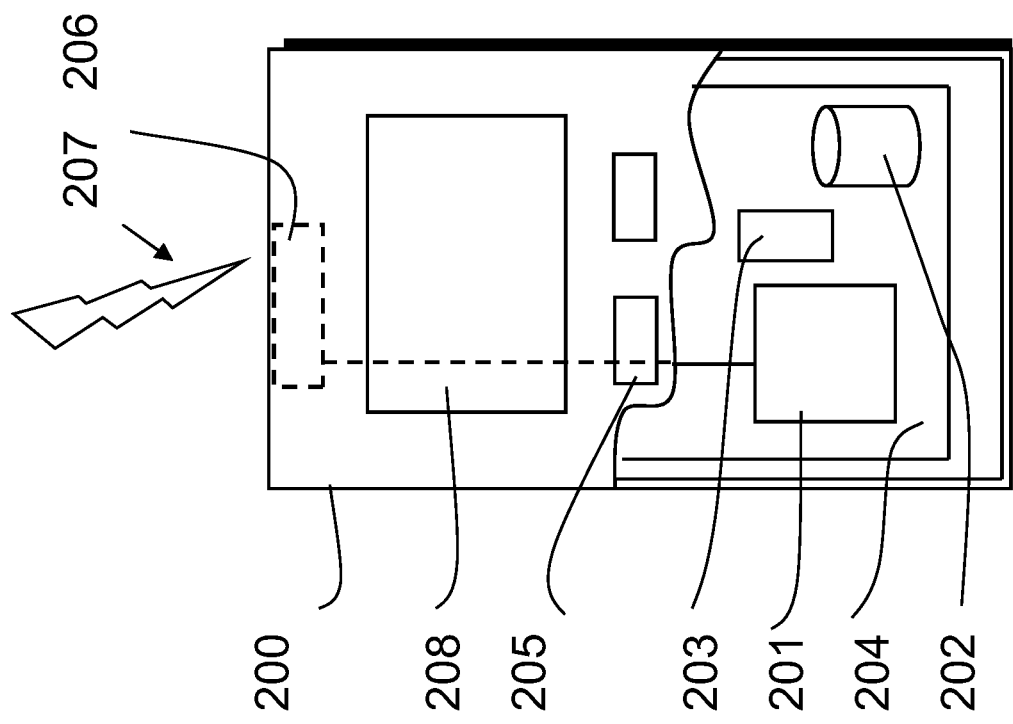
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, voice over IP (VoIP) phones, portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), smart devices, wireless customer-premises equipment (CPE), or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
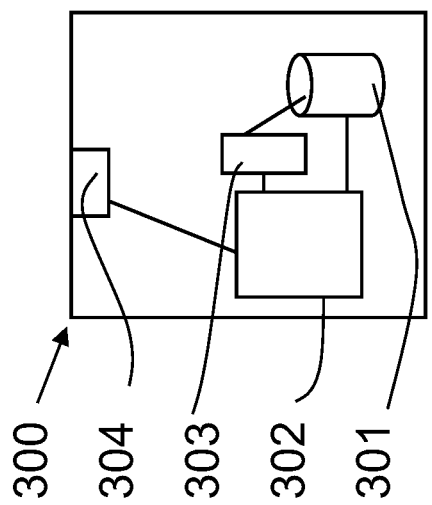
FIG. 3 shows a schematic diagram of an example control apparatus.

FIG. 3 shows an example of a control apparatus 300 for a communication system, for example to be coupled to and/or for controlling a station of an access system, such as a RAN node, e.g. a base station, eNB or gNB, a relay node or a core network node such as an MME or S-GW or P-GW, or a core network function such as AMF/SMF, or a server or host. The method may be implemented in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

Applications may generate periodic traffic streams. In other words, applications send a packet, or a burst of packets, periodically, for example, every 2 or 5 or 10 milliseconds. Some applications have extremely strict latency requirements for end-to-end network delays, for example. 2 milliseconds. For some applications, the delay of every burst needs to be constant, while other applications may tolerate jitter as long as the bursts arrive before the end-to-end delay bound. Examples include applications used, for example, in industrial automation, but also consumer applications such as audio, video, gaming, XR or tactile communications.

In Release 17, periodic delay-critical streams can be supported for IP and Ethernet via generalized Time Sensitive Communication (TSC) mechanisms. In that case, an Application Function (AF) provides the QoS requirements such as maximum delay for TSC QoS flows/traffic flows directly to the 5GS. In addition, for periodic traffic flows, the AF can provide the periodicity, burst size and if it can determine it, the burst arrival time (BAT) for the 5GS Ingress (e.g. UE or UPF depending on the flow direction). That is, the sender transmit time is not provided by the network but is decided by the application itself.

The 5G RAN may, in many cases, introduce part of the end-to-end delay for the traffic streams and may also be the bottleneck from a capacity perspective. While prioritization and overbooking may work in other parts of the network, in the RAN, dedicated resources have to be reserved for periodic delay-critical streams, especially considering traffic with both latency and reliability requirements. For that reason, if the transmission schedules of the different streams are provided by the network in a coordinated manner, the most important thing would be that they are optimal for the RAN rather than any of the other networking nodes on the path.

When Time Division Duplex (TDD) is used on a specific 5G NR radio band, the radio transmissions in uplink and downlink alternate with a repeating cycle. While there is some flexibility to adjust the cycle time and durations of the uplink and downlink transmission slots within it, at least some parts of the cycle are typically statically reserved for a specific direction. To avoid interference, this does not even happen at the granularity of a single cell or single gNB, but is common for a larger area. Thus, TDD cycles and timeslots cannot be adjusted based on individual traffic streams according to their BAT, but the BATs of the individual streams should be adjusted to the TDD cycles and timeslots.

In 3GPP R16/R17, Time Sensitive Communication Assistance Information (TSCAI) including Burst Arrival Time (BAT) has been defined. Here, an application is able to indicate the BAT and periodicity of a stream to the 5GS. The RAN can use this information to plan for the UL/DL schedule. However, the RAN is not able to ask the AF to adapt the BAT or periodicity so that it fits better to its scheduling instants.

A proposal has been made to adjust periodic stream transmit times based on RAN observing and learning the RAN BAT and suggesting shifting to AF and via AF to the Sender. Here, the RAN provides an offset value to AF (SMF->through PCF->(NEF)->AF) to shift the current transmit instant by the offset value. The sender then adjusts the transmit instant with the offset value. This solution works in use cases where the sender is able to adjust the packet transmission instants even after the E2E schedule is established. It does not cover the adjustment of the periodicity that is essential especially for the alignment with the RAN TDD cycle.

One proposal elaborates further that the AF can provide BAT adaptation capability indication to the RAN, who can, in that case, provide the offset to the AF via the time sensitive communication time synchronization function (TSCTSF). This is still mainly for the adjustment while transmission has started and does not cover periodicity.

The following may provide an example mechanism for coordination between RAN scheduling and the periodicity and the RAN BAT of multiple periodic delay critical traffic streams. The coordination allows the RAN BAT of the stream to be determined so that the RAN buffering delay and delay variation are minimized. By doing this, the end-to-end delay and delay variation for the streams may be reduced.

Figure 4:
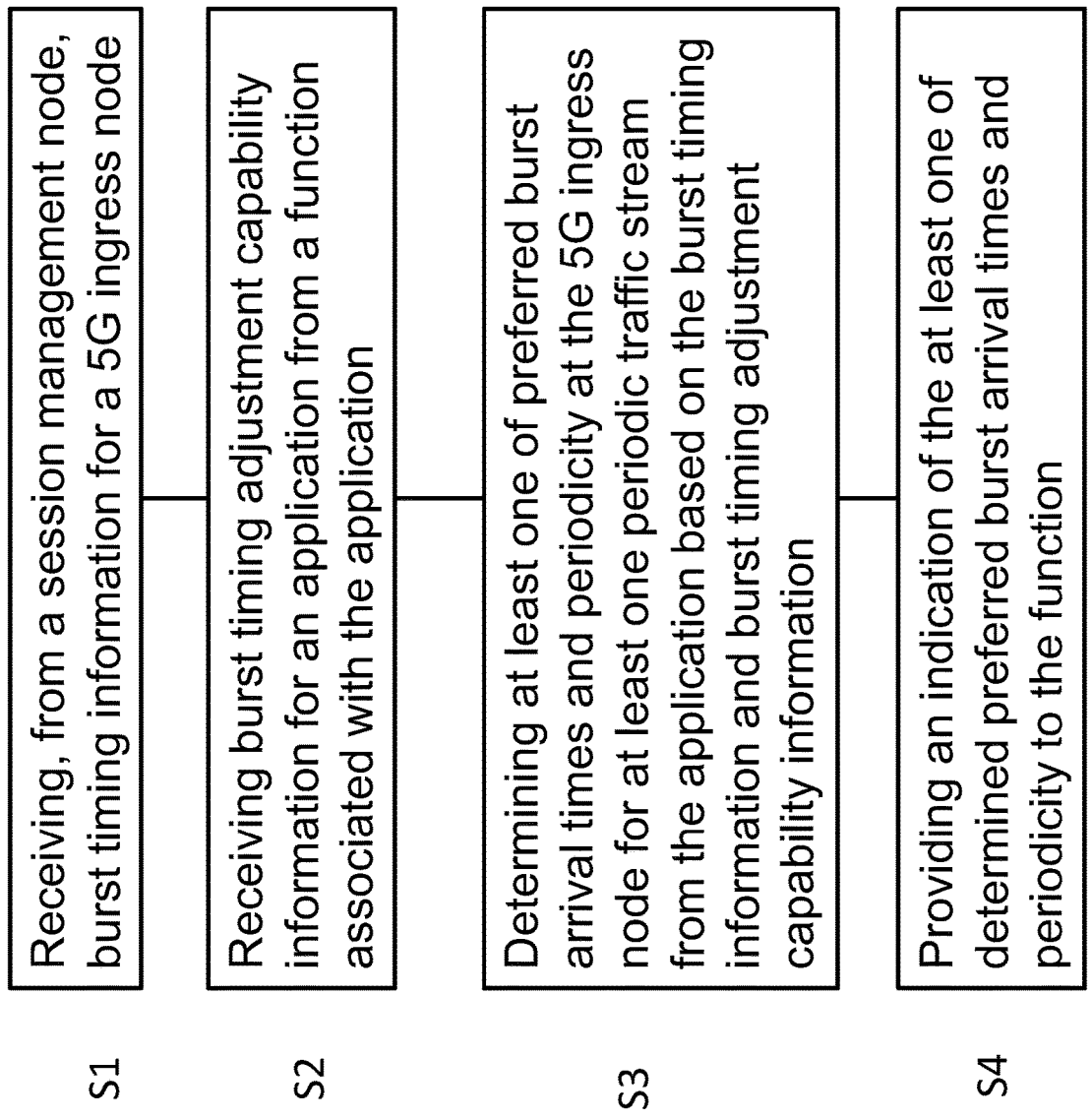
FIG. 4 shows a flowchart of a method according to an example embodiment.

FIG. 4 shows a flowchart of a method according to an example embodiment. The method may be performed at a network node, such as a TSCTSF.

The method comprises, in S1, receiving, from a session management function, burst timing information for a 5G ingress node.

In S2, the method comprises receiving burst timing adjustment capability information for an application from a function associated with the application.

In S3, the method comprises, determining preferred burst arrival times and/or periodicity at the 5G ingress node for at least one periodic traffic stream from the application based on the burst timing information and burst timing adjustment capability information.

In S4, the method comprises providing an indication of the determined preferred burst arrival times and/or periodicity to the function.

Figure 5:
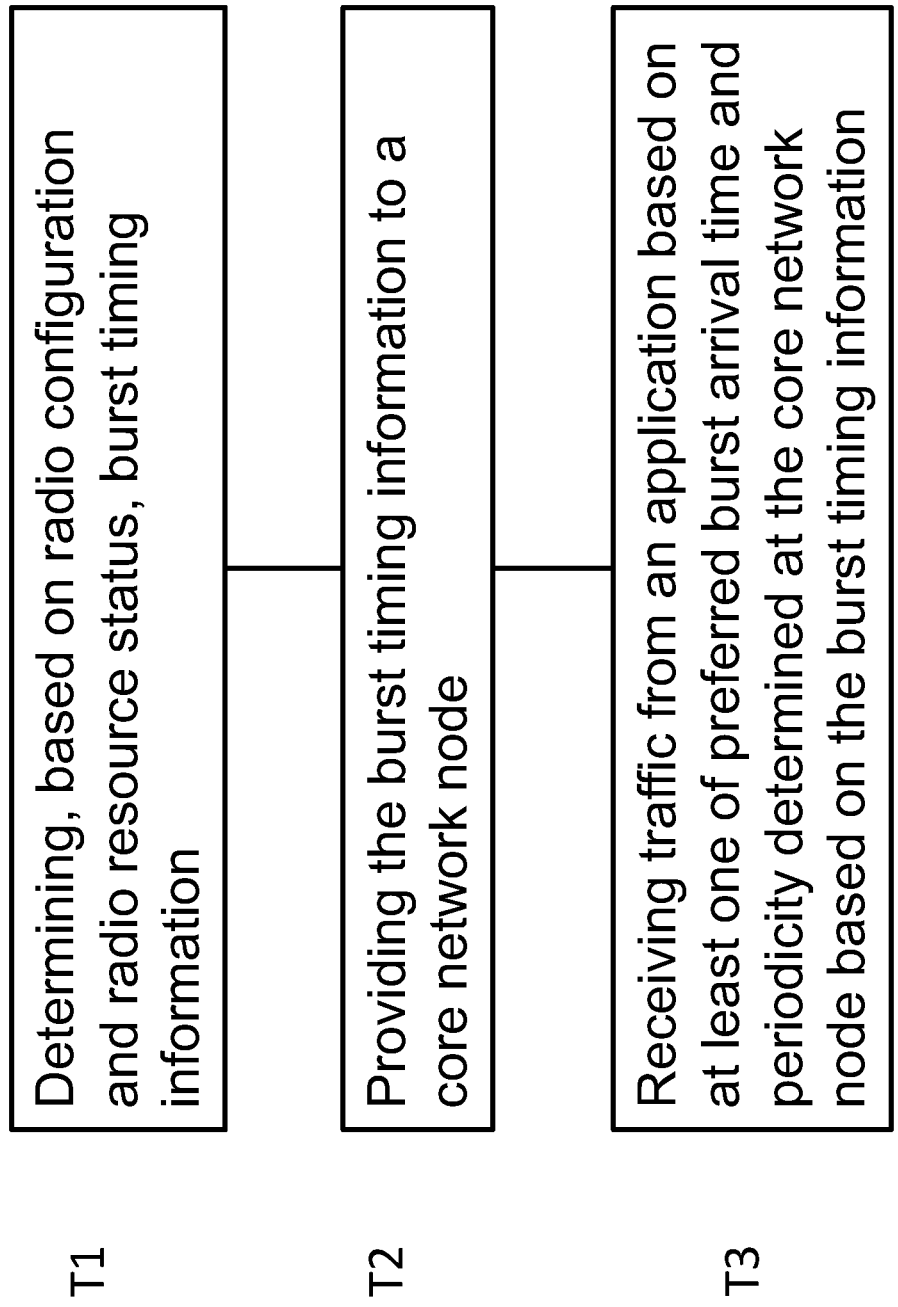
FIG. 5 shows a flowchart of a method according to an example embodiment.

FIG. 5 shows a flowchart of a method according to an example embodiment. The method may be performed at a RAN node.

In T1, the method comprises determining, based on radio configuration and radio resource status burst timing information.

In T2, the method comprises providing the burst timing information to a core network node.

A RAN node may provide burst timing information to a SMF

In T3, the method comprises receiving traffic from an application based on a preferred burst arrival time and/or periodicity determined at the core network node based on the burst timing information.

Figure 6:
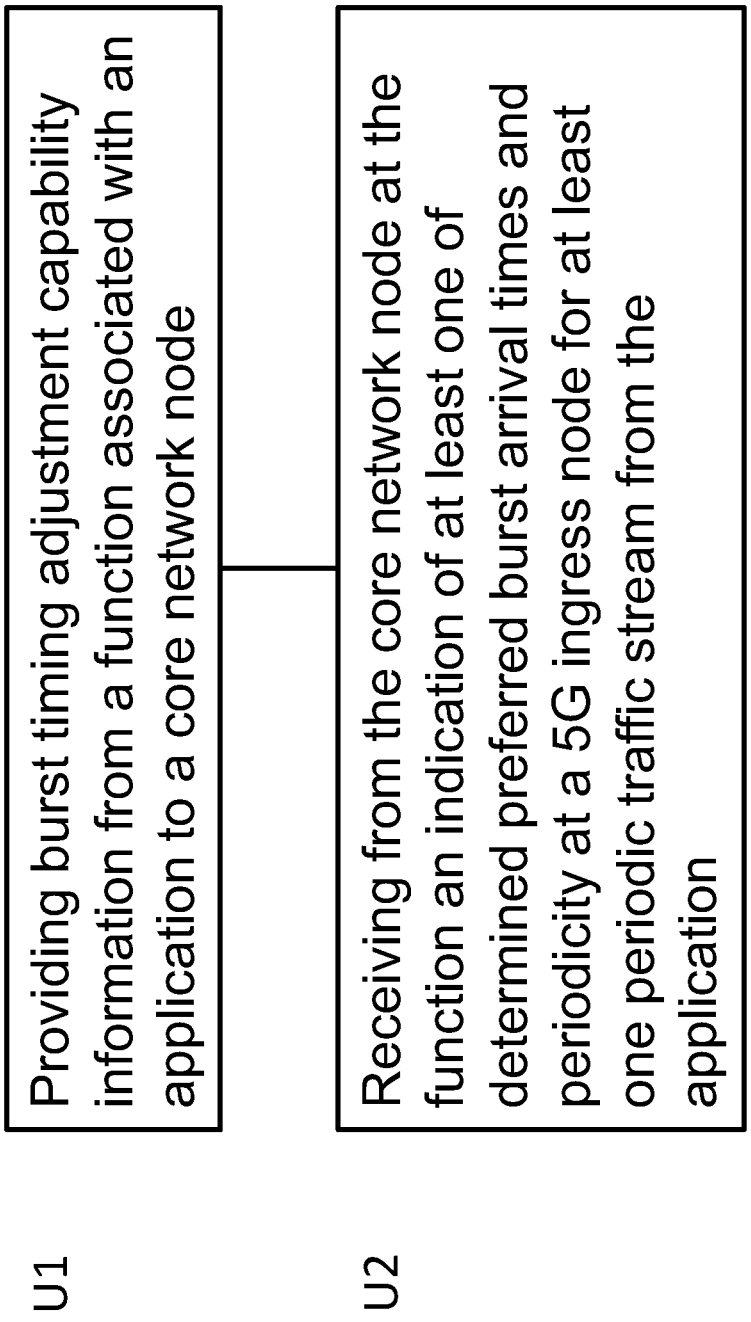
FIG. 6 shows a flowchart of a method according to an example embodiment.

FIG. 6 shows a flowchart of a method according to an example embodiment. The method may be performed at a network function associated with an application, in other words, an application function (AF).

In U1, the method comprises providing burst timing adjustment capability information from a function associated with an application to a core network node.

In U2, the method comprises receiving from the core network node at the function an indication of determined preferred burst arrival times and/or periodicity for at least one periodic traffic stream from the application.

In the method of FIG. 6, the CN node may be a TSCTSF.

FIG. 7 shows a flowchart of a method according to an example embodiment. The method may be performed at a SMF.

In V1, the method comprises receiving, from a radio access node, burst timing information.

In V2, the method comprises determining 5G ingress node timing information based on the burst timing information.

In V3, the method comprises providing the 5G ingress node timing information to a core network node. The method may comprise considering external clock drifts In an example embodiment, for a given UE, the RAN node determines a preferred time window for burst arrival (in other words, Burst Arrival Window (BAW) taking radio configuration, such as TDD time slots in UL and DL, and radio resource status e.g. allocated configured grant resource into account and communicates the preferred time window in burst timing information (also referred to as burst timing feedback) to a central entity, such as TSCTSF via a SMF. The RAN node may be configured via OAM to turn ON or OFF the capability to determine the preferred time window or "timing feedback" calculation capability.

The burst timing information may comprise at least one of an indication of a BAW and periodicity information.

The method may comprise receiving the burst timing information prior to the radio access node receiving at least one traffic stream from the application. In this case, the burst timing information may comprise at least one of an indication of a BAW in absolute time or relative time and periodicity information. Periodicity information may be provided as a time interval between the start of two bursts. The periodicity information may comprise preferred burst periodicity in UL and DL separately.

In an example embodiment, if a RAN preference for Burst Arrival Window (BAW) is communicated in burst timing information before the bursts of a periodic stream are transmitted, RAN feedback includes the BAW in absolute time or relative time and burst periodicity separately for UL and DL.

The method may comprise receiving the burst timing information after the radio access node receives at least one traffic stream from the application. In this case, the burst timing information may comprise at least one of an indication of a BAW in absolute time or relative time, a BAT offset value and periodicity information. If the feedback is given after the initial bursts have arrived at the RAN, the BAT offset value may be a time offset value related to the observed arrival time of those bursts.

The method may comprise receiving an indication in protocol data unit (PDU) session modification signalling and providing the burst timing information in response to the signalling. The indication received in PDU session signaling may trigger the RAN node to communicate the timing feedback to the 5GC. The indication may comprise the burst timing adjustment capability information.

The TSCTSF receives burst timing adjustment capability of an application from the AF and communicates burst timing preferences based on the burst timing feedback to the AF.

An Application Function (AF) communicates to the central entity (TSCTSF) the application capabilities to adjust burst transmission schedule and adjusts transmission schedule based on the burst timing preference information received from the TSCTSF.

Adjustment capabilities may include pro-active BAT adjustment pro-active periodicity adjustment and reactive mid-stream time offset shift (in other words, BAT offset).

The burst timing adjustment capability is per stream (QoS flow) and per direction. It may be provided separately for burst transmission and periodicity. For both burst transmission and periodicity two separate non mutually exclusive capabilities are possible: "proactive" and "mid-stream". Proactive means that the optimal value can be provided before the stream transmission starts (shown in FIGS. 8a, 8b and 9 as described below), while mid-stream means it can be provided at any point during the stream transmission (shown in FIG. 10). In the proactive case the optimal BAW value is provided in absolute time or relative time, while in the mid-stream case it is provided as an offset to the current observed arrival time/window. The AF provides the burst timing adjustment capabilities (based on application endpoint capabilities) to the TSCTSF, who provides them to the RAN node.

The method may comprise receiving timing correction information from a network function at the TSCTSF. The network function may be a SMF.

In an example embodiment, SMF translates the (absolute time) burst arrival window from 5G clock to external clock and from RAN reference point to 5G ingress reference point considering the clock drift between the 5G clock and external clock, UE-DS-TT residence time and CN PDB. The shift from RAN to 5G Ingress reference points is done by subtracting UE-DS-TT residence time from the UL BAW and CN PDB from DL BAW. SMF forwards the preferred 5G Ingress BAW and preferred periodicity for UL and DL along with UE-DS-TT residence time to the TSCTSF. SMF may optionally provide TSCTSF also the clock drift on a time domain basis between the 5G clock and the external clock for the purposes of future updates.

In the case of significant drift beyond a certain threshold between external clock and 5G clock, SMF may get an updated offset from the UPF [using an existing N4 procedure]. In that case, the SMF notifies the TSCTSF with the latest clock drift on a time domain basis so that the TSCTSF is able to update the BAW values it has stored for the given time domain accordingly.

The burst timing information may be associated with a user equipment, a PDU session, a QoS flow or a traffic flow The central entity (TSCTSF) orchestrates the RAN burst timing feedback delivery to the AF for a given UE/QoS flow and may also further consider burst timing across multiple UEs/QoS Flows.

For example, the TSCTSF may receive burst timing feedback from the RAN node and may store the feedback into PDU session specific burst timing record per UE/QoS flow/traffic flow. If TSCTSF does not have timing record for impacted PDU session when the QoS request for TSC stream from the AF arrives, TSCTSF triggers RAN node to send burst timing feedback. Otherwise, TSCTF derives preferred BATs from the stored RAN feedback in timing record and indicates preferred BATs to AF without involving BAT.

The TSCTSF may derive exact 5G ingress burst arrival times from the wider burst arrival window from the RAN node. Optionally, TSCTSF may also coordinate that BATs of different streams using the same RAN node so that they do not overlap and cause burst collision at radio interface.

The AF is in communication with the actual application sender endpoint and configures the application sender's transmission schedule.

Figure 8A:
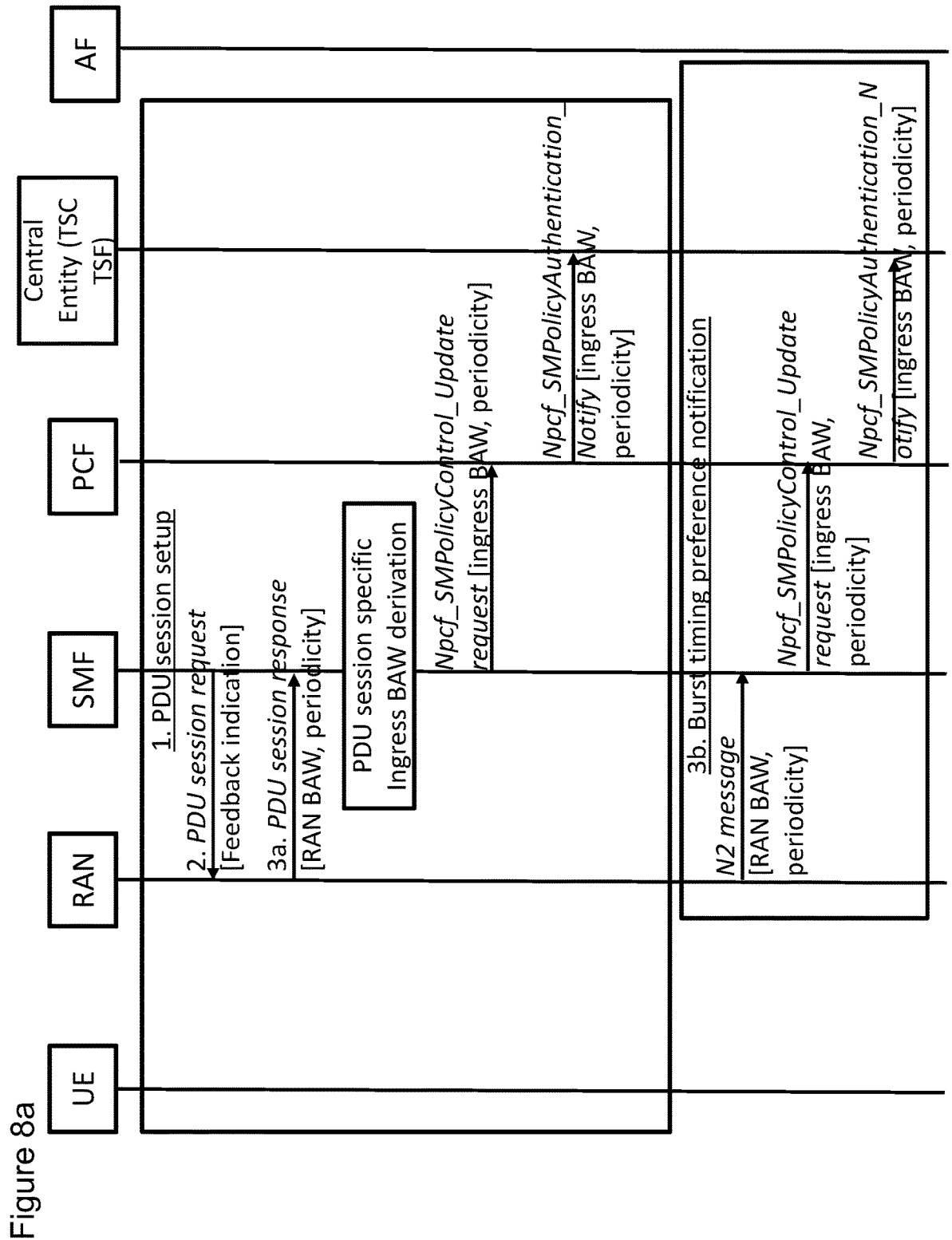
FIG. 8a shows a signalling flow according to an example embodiment.
Figure 8B:
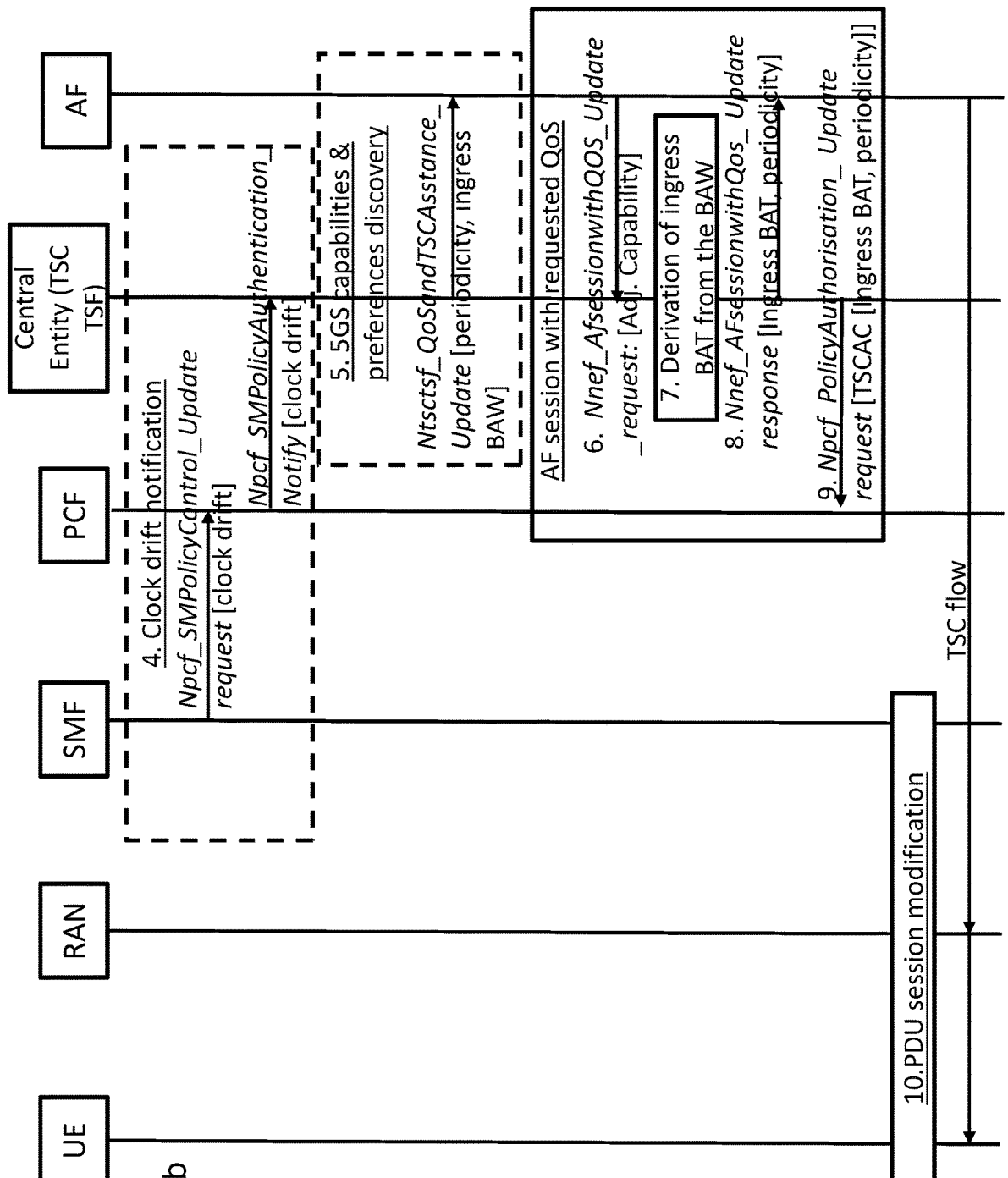

FIGS. 8a and 8b show a signalling flow for an example scenario where PDU session specific RAN burst timing preferences are communicated to central entity prior AF requests QoS for a TSC flow using the AF requested QoS procedure.

In procedure 1, SMF initiates PDU Session setup signaling along with an indication to notify RAN preferences for burst arrival timing (burst arrival window for the first packet and the preferred periodicity) for UL and DL. RAN may provide the burst arrival timing in response to the PDU Session signaling. If the preferences change later, RAN may also update the preferences via notification control procedure.

In step 2, the RAN node receives, in a PDU session setup signaling, an indication from the SMF, indicating RAN to send burst timing preferences to the 5GC.

In step 3, the RAN derives preferred BAW and preferred periodicity for UL and DL from the radio configuration and sends burst timing preferences in burst timing information to the CN (SMF in this scenario). The RAN derived BAW indicates the arrival time window at the RAN node.

At 3a) the timing preferences may be sent in a PDU session signalling.

In 3b) if the RAN timing preferences change at any time, a suitable notification procedure from RAN to SMF is used.

The SMF translates the BAW at the RAN to BAW at the 5G ingress point by taking CN PDB and UE-DS-TT Residence time into account. SMF also translates BAW from 5G to the external clock (used by the AF and the application endpoints) using the clock offset information it has. The SMF provides preferred BAW, preferred periodicity to the TSCTSF along with the UE-DS-TT Residence time. SMF may also provide the current offset between the 5G Clock and external clock for future update purposes.

Once the TSCTSF receives RAN burst timing preferences it stores them into PDU session specific RAN burst timing record including the preferred UL and DL ingress BAW and periodicity.

In step 4, if due to drift between the 5G clock and the external clock SMF receives from UPF an updated offset between the clocks, SMF notifies TSCTSF about the updated offset. This allows TSCTSF to update the preferred BAW values it has stored.

In step 5, if burst timing adjustment capable AF has subscribed to burst timing notifications from the NEF or directly with the TSCTSF, TSCTSF sends RAN preferences to the AF either directly or via NEF. The AF may utilize RAN burst timing preferences, for example for determining the correct burst size matching the RAN preferred periodicity.

A notification to AF is sent any time there is a change in burst timing information (BAW or periodicity), for instance triggered by RAN in step 3b) or by the SMF in step 4).

In step 6, when the AF requests QoS for the TSC stream, it indicates the burst timing adjustment capability to TSCTSF.

In step 7, the TSCTSF determines if it has a timing record for impacted PDU session(s) and derives ingress BAT from the stored ingress BAW of PDU session. When determining the ingress BAT the TSCTSF may take BATs of other TSC streams using the same RAN node into account, for example for avoiding burst collision at RAN due to identical BATs.

If the application is capable of multiple timing adjustment methods, the TSCTSF may select which one to use. It may select for example, between the pro-active burst sending adjustment and mid-stream offset shift. In the latter case the procedure follows the scenario shown in FIG. 8 (from message 2 onward).

In step 8, the TSCTSF communicates derived ingress BAT and periodicity to the AF.

In step 9, the TSCTSF also derives TSCAC based on the derived ingress BAT and periodicity and communicates it to PCF.

In step 10, the QoS configuration of the PDU session is modified to support TSC stream requirements, with standard PDU session modification procedure.

Figure 9:
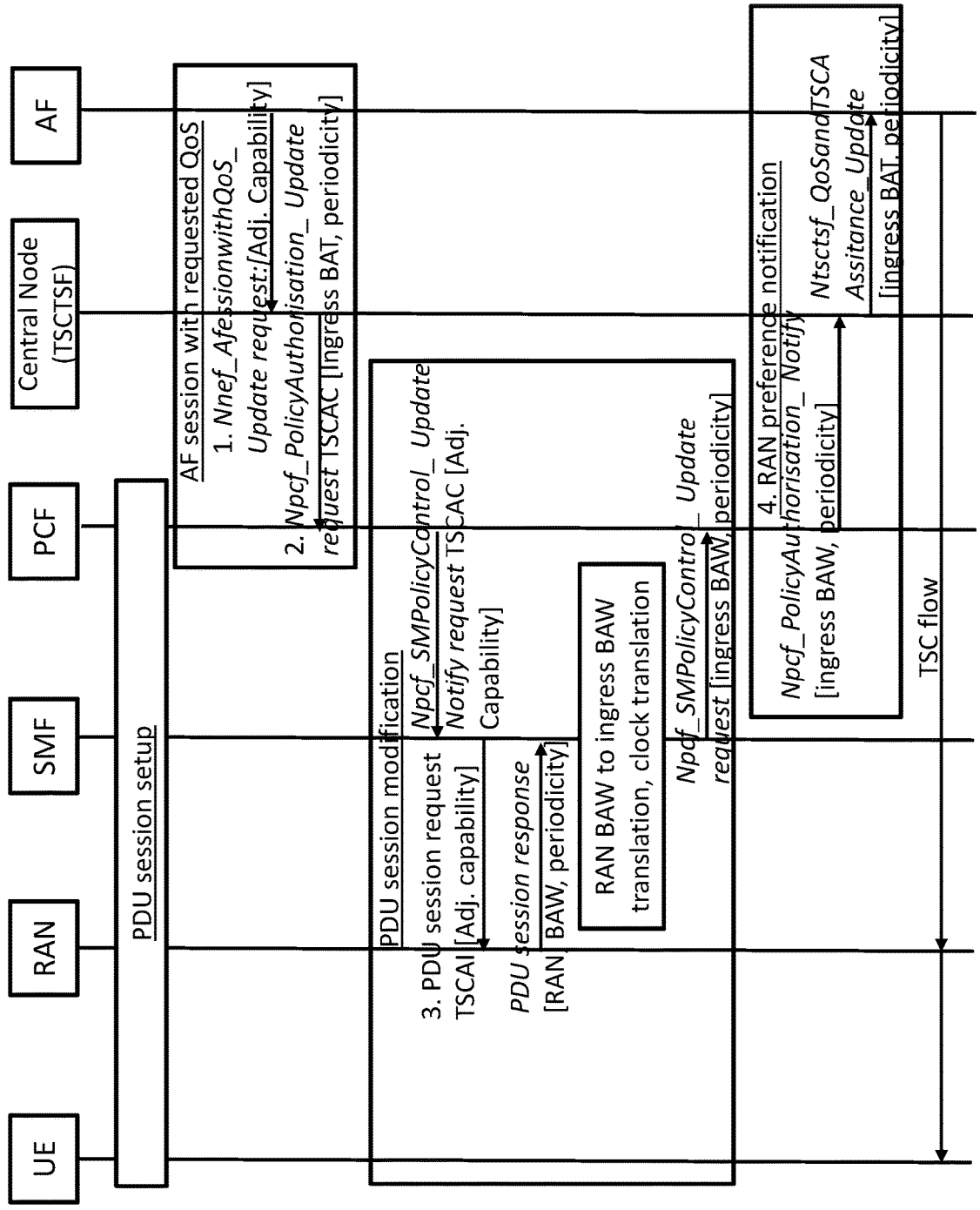
FIG. 9 shows a signalling flow according to an example embodiment.

FIG. 9 shows a signalling flow for a scenario where a central entity does not have RAN burst arrival timing info when AF requests QoS for TSC stream.

In step 1, when the AF requests QoS for the TSC stream, it indicates the burst timing adjustment capability to TSCTSF.

In step 2, the TSCTSF determines that it does not have a timing record for impacted PDU session(s). If the application is capable of multiple timing adjustment methods, the TSCTSF may select which one to use. TSCTSF derives TSCAC, includes the burst timing adjustment capability indication of the selected adjustment method into TSCAC and sends the burst timing adjustment capability information to PCF.

In step 3, the RAN receives the burst timing adjustment capability in PDU session modification signaling for QoS configuration for the TSC stream. Based on the burst timing adjustment capability and local decision RAN selects the pro-active timing adjustment, derives preferred BAW at the RAN and periodicity and sends the preferred BAW at the RAN and periodicity to 5GC in PDU session modification signalling or by using a notification procedure to update the BAW or periodicity at anytime. Instead of wider burst arrival window, RAN may take full control of burst arrival timing and determine exact burst arrival time for a TSC flow. The SMF translates the BAW at the RAN to BAW at the 5G ingress point by taking CN PDB and UE-DS-TT Residence time into account. SMF also translates BAW from 5G clock to external clock using the clock offset information it has.

In step 4, the TSCTSF receives preferred ingress BAW and periodicity from the PCF.

The TSCTSF may store RAN timing preferences into PDU session specific timing record.

If TSCTSF receives an ingress BAW instead of BAT it derives the BAT from the BAW and communicates it with the periodicity to the AF.

Figure 10:
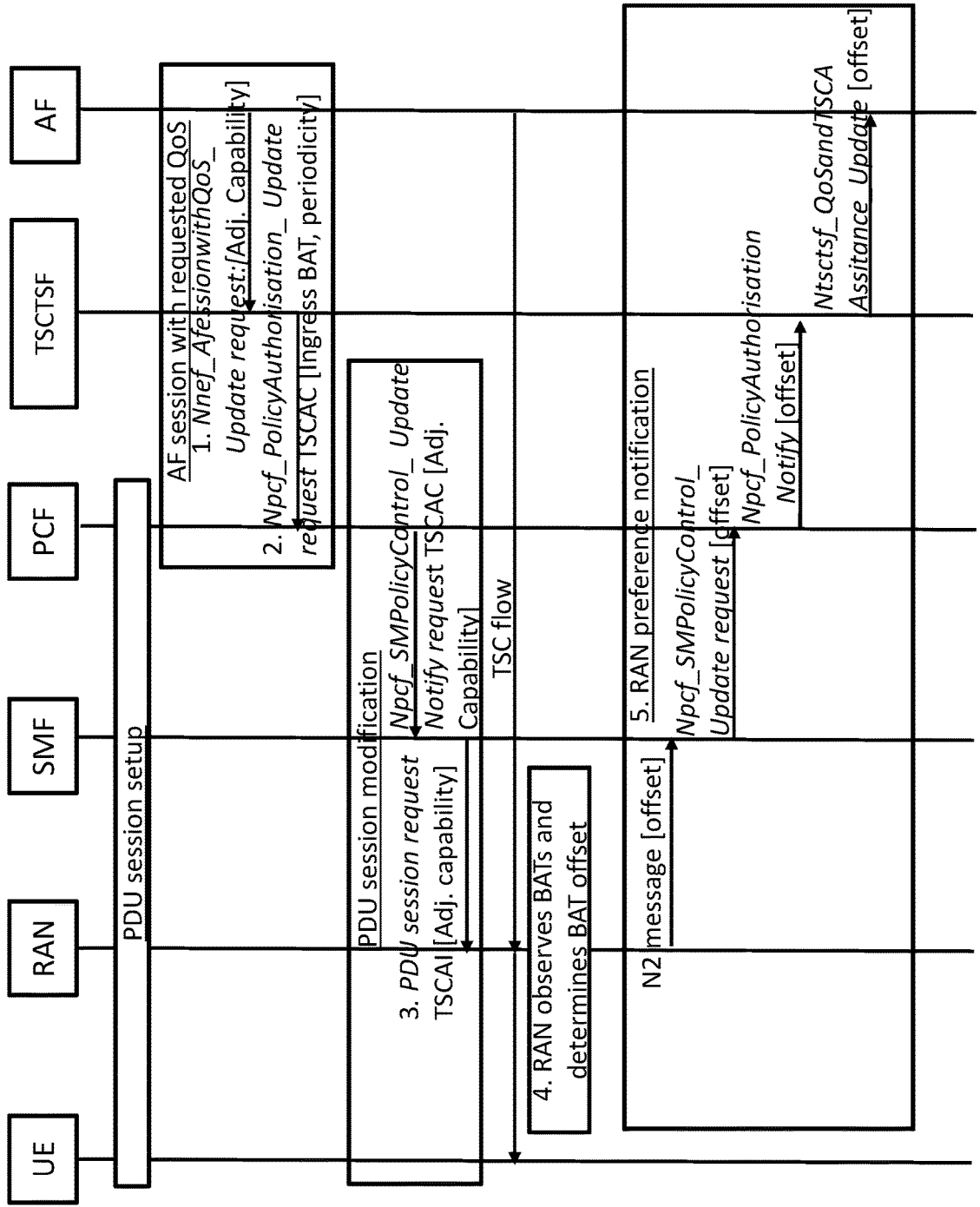
FIG. 10 shows a signalling flow according to an example embodiment.

FIG. 10 shows a signalling flow for reactive burst arrival timing adjustment.

Step 1 and step 2 of the signalling flow in FIG. 10 are the same as that of FIG. 9.

In step 3, burst timing adjustment capability indicates only the mid-stream offset shift capability, or the RAN selects the mid-stream offset shift from the multiple timing adjustment options.

The RAN does not communicate to 5GC any burst arrival timing preferences before packets of the TSC flow start to occur into RAN or into UE in UL streams.

In step 4, the RAN observes BATs and if burst arrival schedule is not optimal for radio configuration, RAN determines needed time offset and provides it to the SMF which forwards it to the TSCTSF.

In step 5, the TSCTSF communicates the BAT offset to the AF either directly or via NEF.

It is also possible that different scenarios are used for determining the optimal BAW and optimal periodicity. In a possible solution, the AF first determines the optimal periodicity using the signalling flow shown in FIG. 8b (step 5). This allows the AF to calculate the exact burst size for that periodicity. The optimal BAW may after that be determined either using the signalling flow in FIGS. 9 and 10.

In another overall solution the optimal periodicity is provided to the AF using the signalling flow in FIG. 9, while the optimal BAW is provided using the signalling flow in FIG. 10.

Any multiple of the optimal periodicity value is also considered optimal. For example, if the optimal periodicity value is 1500 microseconds, also n*1500 microseconds is considered optimal.

An apparatus may comprise means for receiving, from a session management node, burst timing information for a 5G ingress node, receiving burst timing adjustment capability information for an application from a function associated with the application, determining at least one of preferred burst arrival times and periodicity at the 5G ingress node for at least one periodic traffic stream from the application based on the burst timing information and burst timing adjustment capability information and providing an indication of the at least one of determined preferred burst arrival times and periodicity to the function.

Alternatively, or in addition, an apparatus may comprise means for, at a radio access node, determining, based on radio configuration and radio resource status, burst timing information; providing the burst timing information to a core network node and receiving traffic from an application based on at least one of preferred burst arrival time and periodicity determined at the core network node based on the burst timing information.

Alternatively, or in addition, an apparatus may comprise means for, at a session management function, receiving, from a radio access node, burst timing information, determining 5G ingress node timing information based on the burst timing information and providing the 5G ingress node timing information to a core network node.

Alternatively, or in addition, an apparatus may comprise means for providing burst timing adjustment capability information from a function associated with an application to a core network node and receiving from the core network node at the function an indication of at least one of determined preferred burst arrival times and periodicity at a 5G ingress node for at least one periodic traffic stream from the application.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable):
   (i) a combination of analog and/or digital hardware circuit(s) with software/firmware and
   (ii) any portions of hardware processor(s) with software (including digital signal processor(s)), software, and memory(ies) that work together to cause an apparatus, such as a mobile phone or server, to perform various functions) and
 (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus, comprising:
   at least one processor; and
   at least one memory comprising instructions that, when executed by the at least one processor, cause the apparatus at least to:
   receive, from a session management function, burst timing information for a 5G ingress node;
   receive, from a function associated with an application, burst timing adjustment capability information for the application;
   determine, for at least one periodic traffic stream from the application, based on the burst timing information and burst timing adjustment capability information, at least one of preferred burst arrival times and periodicity at the 5G ingress node; and
   providing, to the function, an indication of the at least one of the determined preferred burst arrival times and the periodicity.

2. The apparatus according to claim 1, wherein the instructions are further configured to, when executed by the at least one processor, cause the apparatus to:
   provide the burst timing information to the function associated with the application.

3. The apparatus according to claim 1, wherein the burst timing information comprises at least one of an indication of a burst arrival window, BAW, and periodicity information.

4. The apparatus according to claim 1, wherein the instructions are further configured to, when executed by the at least one processor, cause the apparatus to receive the burst timing information prior to a radio access node receiving at least one traffic stream from the application, and wherein the burst timing information comprises at least one of an indication of a BAW in absolute time, an indication of a BAW in relative time and periodicity information.

5. The apparatus according to claim 1, wherein the instructions are further configured to, when executed by the at least one processor, cause the apparatus to receive the burst timing information after a radio access node receiving at least one traffic stream from the application and wherein the burst timing information comprises at least one of an indication of a burst arrival time, BAT, an offset value, an indication of a BAW in absolute time, an indication of a BAW in relative time and periodicity information.

6. The apparatus according to claim 1, wherein the burst timing information is associated, for at least one of uplink and downlink, with a user equipment, a packet data unit session, a quality of service flow or a traffic flow.

7. An apparatus, comprising:
   at least one processor; and
   at least one memory comprising instructions that, when executed by the at least one processor, cause the apparatus at least to:
   receive an indication in protocol data unit session modification signalling, the indication comprising an indication of burst timing adjustment capability information for a function associated with an application;
   determine, based on radio configuration and radio resource status, burst timing information;
   provide, in response to receiving the indication, the burst timing information to a core network node; and
   receive traffic from the application based on at least one of preferred burst arrival time and periodicity determined at the core network node based on the burst timing information.

8. An apparatus, comprising:
   at least one processor; and
   at least one memory comprising instructions that, when executed by the at least one processor, cause the apparatus at least to:
   receive, from a radio access node, burst timing information;
   determine 5G ingress node timing information based on the burst timing information; and
   provide the 5G ingress node timing information to a core network node.

9. A method, comprising:
   receiving, from a session management function, burst timing information for a 5G ingress node;
   receiving, from a function associated with an application, burst timing adjustment capability information for the application;
   determining, for at least one periodic traffic stream from the application, based on the burst timing information and burst timing adjustment capability information, at least one of preferred burst arrival times and periodicity at the 5G ingress; and
   providing, to the function, an indication of the at least one of the determined preferred burst arrival times and the periodicity.

10. The method according to claim 9, further comprising:
    providing the burst timing information to the function associated with the application.

11. The method according to claim 9, wherein the burst timing information comprises at least one of an indication of a burst arrival window, BAW, and periodicity information.

12. The method according to claim 9, further comprising receiving the burst timing information prior to a radio access node receiving at least one traffic stream from the application, wherein the burst timing information comprises at least one of an indication of a BAW in absolute time, an indication of a BAW in relative time and periodicity information.

13. The method according to claim 9, further comprising receiving the burst timing information after a radio access node receiving at least one traffic stream from the application, wherein the burst timing information comprises at least one of an indication of a burst arrival time, BAT, an offset value, an indication of a BAW in absolute time, an indication of a BAW in relative time and periodicity information.

14. The method according to claim 9, wherein the burst timing information is associated, for at least one of uplink and downlink, with a user equipment, a packet data unit session, a quality of service flow or a traffic flow.

15. A non-transitory computer readable medium comprising program instructions that, when executed by an apparatus, cause the apparatus to perform the method of claim 9.

16. A method comprising:
   receiving an indication in protocol data unit session modification signalling, the indication comprising an indication of burst timing adjustment capability information for a function associated with an application;
   determining, based on radio configuration and radio resource status, burst timing information;
   providing, in response to receiving the indication, the burst timing information to a core network node; and
   receiving traffic from the application based on at least one of preferred burst arrival time and periodicity determined at the core network node based on the burst timing information.

17. A non-transitory computer readable medium comprising program instructions that, when executed by an apparatus, cause the apparatus to perform the method of claim 16.

18. A method, comprising:
   receiving, from a radio access node, burst timing information;
   determining 5G ingress node timing information based on the burst timing information; and
   providing the 5G ingress node timing information to a core network node.

19. A non-transitory computer readable medium comprising program instructions that, when executed by an apparatus, cause the apparatus to perform the method of claim 18.

* * * * *